(12) United States Patent
Pfeffer et al.

(10) Patent No.: US 7,154,879 B1
(45) Date of Patent: Dec. 26, 2006

(54) POINT TO MULTIPOINT NETWORK

(75) Inventors: Robert Pfeffer, Carlisle, MA (US); David mann, Ottawa (CA); Brian Unitt, Herts (GB)

(73) Assignee: Nortel Networks Limited, St. Laurent (CA)

( * ) Notice: Subject to any disclaimer, the term of this patent is extended or adjusted under 35 U.S.C. 154(b) by 854 days.

(21) Appl. No.: 09/867,175

(22) Filed: May 29, 2001

Related U.S. Application Data

(60) Provisional application No. 60/207,800, filed on May 30, 2000.

(51) Int. Cl.
*H04L 12/66* (2006.01)

(52) U.S. Cl. ...................................................... 370/352

(58) Field of Classification Search ................ 725/114, 725/138, 144; 370/390, 401, 465, 468, 442, 370/487, 489, 490, 436, 395.64
See application file for complete search history.

(56) References Cited

U.S. PATENT DOCUMENTS

| | | | | |
|---|---|---|---|---|
| 5,696,765 A | * | 12/1997 | Safadi | ........................ 370/436 |
| 5,699,176 A | * | 12/1997 | Cohen | ........................ 398/66 |
| 6,430,193 B1 | * | 8/2002 | Raissinia et al. | ........... 370/448 |
| 6,434,154 B1 | * | 8/2002 | Stacey et al. | .......... 370/395.64 |
| 6,650,624 B1 | * | 11/2003 | Quigley et al. | ............. 370/252 |
| 6,834,057 B1 | * | 12/2004 | Rabenko et al. | ............ 370/468 |

FOREIGN PATENT DOCUMENTS

WO    WO 98/44758    * 10/1998

OTHER PUBLICATIONS

Data_Over-Cable Service Interface Specification dated 1999 by Cable Television Laboratories, pp. 1-2, 11-20, & 47-57.*
Data Over Cable Service Interface Specification dated 1999 by Cable Television Laboratories, pp. 1-2, 11-20, & 47-57.*

* cited by examiner

*Primary Examiner*—Doris H. To
*Assistant Examiner*—Robert W. Wilson
(74) *Attorney, Agent, or Firm*—Barnes & Thornburg, LLP

(57) ABSTRACT

A point-to-multipoint network arrangement, method of operation and related signals for a network comprising a head-end station and at least one subscriber station connected to the head-end by means of a shared medium high-speed point-to-multipoint network (preferably a passive optical network). The method involves transmitting data upstream using a packet-switched transport protocol (e.g. Ethernet) over TDMA. By using high-speed upstream transmission with relatively long time slots and relatively short guard bands, the need for complex ranging schemes is obviated.

16 Claims, 2 Drawing Sheets

POINT TO MULTIPOINT NETWORK

RELATED APPLICATIONS

This application is the full filing of the provisional application 60/207,800 filed May 30, 2000 and entitled "Gigabit Ethernet-Passive Optical Network" from which this application claims priority.

FIELD OF THE INVENTION

The present invention relates to a method and apparatus for providing a high capacity point-to-multipoint network, a system incorporating the same, and signals generated by such a system. This invention is particularly related to, but in no way limited to, point-to-multipoint networks, known as fibre to the user (FTTU).

BACKGROUND TO THE INVENTION

It is known to design point-to-multipoint access networks based on Passive Optical Networks (PONs). In a PON, a single head end is connected to a number of outstations via optical fibres connected in a tree-like arrangement using one or more passive distributive optical couplers to achieve optical fanout at the logical hub of the network. Typically, separate fibres and couplers are provided for downstream and upstream traffic. Alternatively, traffic in both directions can be combined onto a single fibre using separate wavelengths for upstream and downstream traffic, or by sending optical signals in opposite directions using the same nominal wavelength in each direction. Using this technique, use of optical and electronic equipment at the head end is shared amongst many outstations, often enabling a more economic overall network. Because of the shared nature of the system, each outstation can use only a proportion of the traffic capacity in each direction.

PONs have been studied in detail and standards exist for systems using this technology (for example Full Service Access Network (FSAN)). Existing PON systems generally use a medium access layer protocol based on a fixed length frame structure in which short timeslots are allocated to each outstation to carry downstream traffic using time division multiplexing (TDM). Upstream traffic is also sent in short packets, either according to a fixed schedule, or allocated dynamically on a frame by frame basis. The technique is referred to as Time Division Multiple Access (TDMA). Typically, to maximise efficiency, particularly when using short packets, each outstation adjusts its transmission time according to its distance from the head end in order that packets from multiple outstations arrive at the head end consecutively, without overlap but with minimum inter-packet gap. Measuring the time differential arising from different physical distances between the head end and the various outstations is normally performed by control functions at the head end. These control functions then inform individual outstations how to configure the upstream transmission times in order to achieve interleaving. This process is known as 'ranging' or 'marshalling'.

A disadvantage of this approach is that the ranging process involves considerable complexity and custom designed integrated circuits are required at both the head end and the outstations in a practical system.

A further drawback is that because PON systems built according to FSAN principles normally use short packets for information transfer, transmission of data already formatted into larger packets requires these larger packets to be segmented for transport over the PON, adding further complexity.

The rapid rise in the use of the internet has increased the requirement to transmit packets carrying Internet Protocol (IP). At the transport layer, these packets already often use Ethernet technology, which allows packet sizes of up to around 1500 bytes. Networks carrying in IP traffic must support packets of up to at least 576 bytes, larger than can be carried unsegmented in an FSAN PON.

OBJECT OF THE INVENTION

The invention seeks to provide an improved method and apparatus for providing high capacity point-to-multipoint communications networks, especially in access networks.

SUMMARY OF THE INVENTION

According to a first aspect of the present invention there is provided a point-to-multipoint network arrangement comprising: a head-end station; at least one subscriber station; a point-to-multipoint network providing shared medium connectivity between each subscriber station and the head-end station; wherein each subscriber station is arranged to transmit data that has previously been segmented into packet-switched transport protocol packets to the head-end station, using a time division multiple access protocol without the need to further segment the packet-switched protocol packets.

Preferably, the packet-switched transport protocol employs packets formatted according to an Ethernet protocol.

Preferably, the packet-switched transport protocol is arranged to carry Internet Protocol data.

Preferably, the packet-switched transport protocol is arranged to be able to carry Ethernet frames of the maximum permitted length in order to avoid the need for segmentation of Ethernet frames generated by customer premises equipment.

Preferably, the TDMA protocol employs frames each arranged to carry multiple packet-switched transport protocol packets.

Preferably, the subscriber stations periodically receive synchronisation signals transmitted from the head end-station.

Preferably, the differential time delays arising from differing path lengths between the head-end station and outstations are absorbed by including guard bands in the TDMA protocol.

Preferably, the point-to-multipoint network is an optical network.

Preferably, the optical network is a passive optical network.

Preferably, the point-to-multipoint network is one of a wireless network and a high-speed copper network.

In one preferred embodiment, each subscriber station is allocated to one of a plurality of groups, each group transmitting on a distinct physical channel (for example wavelength in an optical network, or frequency in a wireless network).

According to a further aspect of the present invention there is provided a head-end station for a point-to-multipoint network comprising at least one subscriber station, and a point-to-multipoint network providing shared medium connectivity between each subscriber station and the head-end station, the head-end station being arranged to receive from the at least one subscriber station data previously segmented into packet-switched transport protocol packets and transmitted using a time division multiple access protocol without the packet-switched protocol packets having been further segmented.

The invention also provides for a telecommunications system, and especially an access telecommunications system, which comprises one or more instances of apparatus embodying the present invention, together with other additional apparatus.

In particular, the invention is also directed to a telecommunications access network comprising a point-to-multipoint network arrangement according to any of the foregoing aspects of the present invention.

Preferably, the point-to-multipoint network is an optical network, and ideally a passive optical network.

The invention is also directed to methods by which the described apparatus and systems operate and including method steps for carrying out every function of the apparatus.

In particular, according to a second aspect of the present invention there is provided a method of operating a point-to-multipoint network arrangement comprising a head-end station, at least one subscriber station, and a point-to-multipoint network providing optical connectivity between each subscriber station and the head-end station, comprising the steps of: transmitting upstream using a packet-switched transport protocol over a TDMA protocol configured to obviate segmentation of packet-switched transport protocol packets.

The invention also provides for communication signals generated by the described apparatus, singly and in combination.

In particular, according to a third aspect of the present invention there is provided a communications signal comprising a sequence of TDMA frames each separated by a guard band, and each TDMA frame arranged to carry at least one complete packet-switched transport protocol packet. Note that the term 'TDMA frame' refers to a time segment during which a particular outstation is permitted to impress a signal on the upstream medium and does not necessarily imply the presence of any transmitted bit patterns other than the packet-switched transport protocol packets to be transmitted by the outstation.

Preferably, each TDMA frame is arranged to carry a plurality of packet-switched transport protocol packets.

There is also provided an upstream communications signal in a shared-medium point-to-multipoint access network, the signal comprising a sequence of TDMA frames each separated by a guard band, each TDMA frame being arranged to carry at least one complete packet-switched transport protocol packet.

Advantageously, the invention allows an access network to be built where the head end equipment and much of the fibre infrastructure can be shared between a number of end customers.

Advantageously, it avoids the need for highly specialised integrated circuit development. Because the data-carrying times slots are themselves very long, the guard bands between the data-carrying time slots can themselves can themselves be longer than in previously known systems without adversely affecting efficiency: they still consume only a small proportion of the overall bandwidth. Consequently, the complex ranging and timing mechanisms required to minimise guard bands in lower bit rate networks are obviated.

In a preferred embodiment the packet switched protocol is an Internet Protocol.

Advantageously, it allows transport of IP packets without segmentation.

Multiple access networks allow fibre and exchange end equipment to be shared across groups of end customers, resulting in a more cost effective infrastructure.

Alternatively, this invention allows a multiple access network to be built without the need for active electronics in street locations. A network requiring only passive elements in outside locations would be more attractive, particularly to incumbent network operators who traditionally have not used active street equipment.

Advantageously, the possibility of reusing existing technology designed for Gigabit Ethernet offers the opportunity of achieving shorter time to market than developing entirely new technology for the system.

A packet or IP based passive access network based on Gigabit Ethernet, offers a disruptive technology alternative to the FSAN ATM PON.

The invention is also directed to software by which the described apparatus, systems, and methods operate and including steps for carrying out every corresponding function of the invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
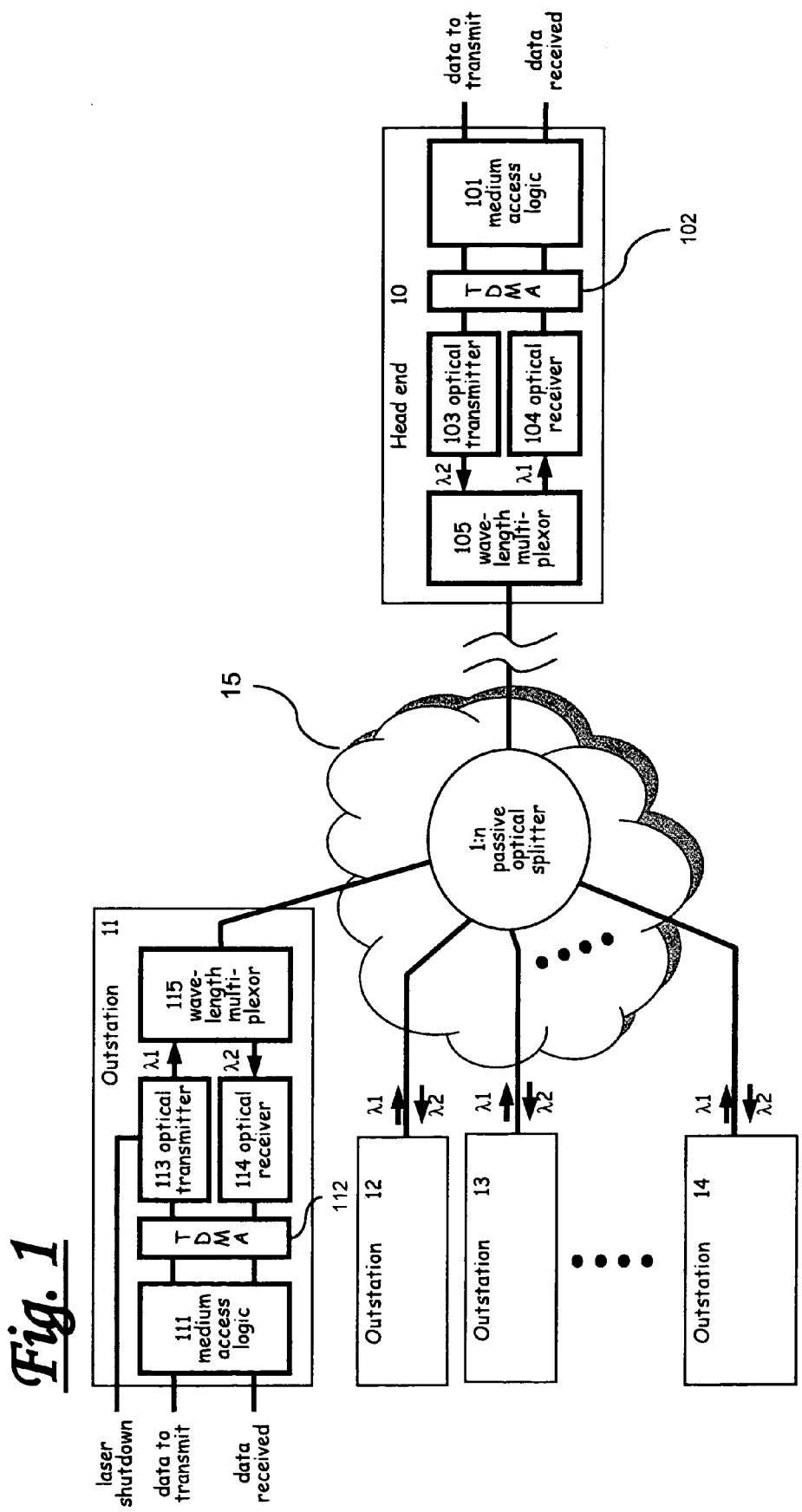
FIG. 1 shows a block diagram of an optical point-to-multipoint network in accordance with the present invention.

Referring to FIG. 1, there is shown an optical network arrangement comprising a head-end station 10 and, multiple subscriber stations 11–14 connected by a passive optical network 15.

The system is arranged to provide an improved form of multiple access passive optical network, not based on small packets and ranging to achieve efficiency, but rather using variable sized (e.g. Ethernet) packets each able to carry IP traffic directly without segmentation.

The head-end station 10 comprises medium access logic 101 interfacing via a TDMA framing and sychronisation module 102 to optical transmitter 103, optical receiver 104, and hence to a wavelength multiplexer 105 which provides the physical interface to the optical network 15.

Each outstation 11–14 has a corresponding structure comprising medium access logic 111 connected via the TDMA framing and sychronisation module 112 to an optical transmitter 113 and optical receiver 114 and hence to a wavelength multiplexer 115 again providing the physical interface to the network 15.

Figure 2:
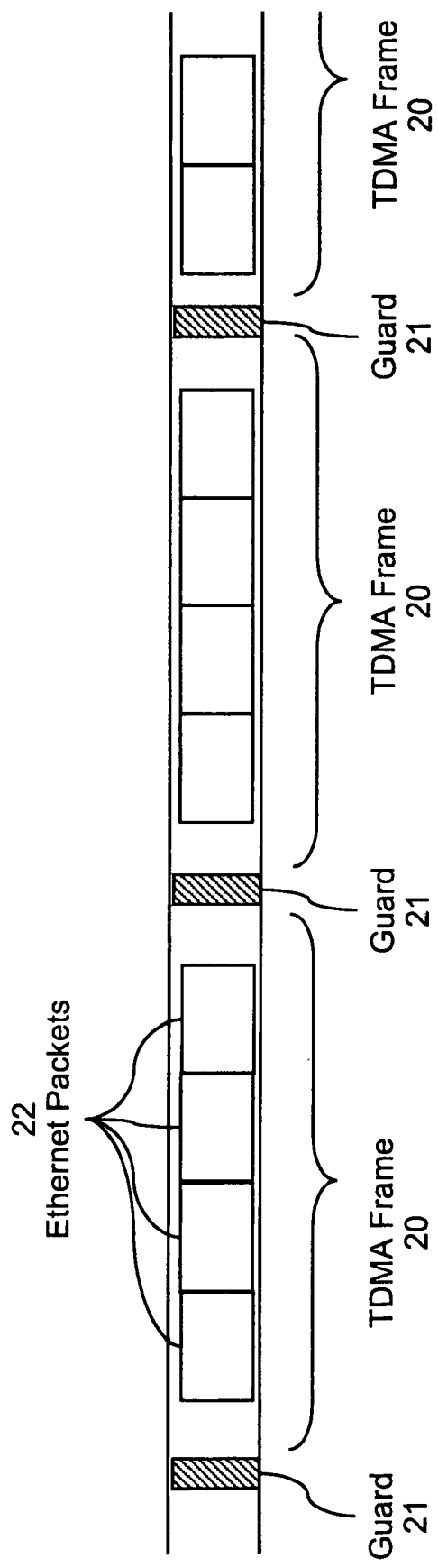
FIG. 2 shows a schematic diagram of an upstream data stream in accordance with the present invention.

Referring to FIG. 2, there is shown an example of an upstream signal structure in such a system. The data stream comprises a sequence of TDMA frames 20 each separated by a guard period 21.

Multiple Ethernet packets 22 are transported within each TDMA frame and for data transport, the Ethernet frames are each preferably sized to be large enough to carry complete Internet protocol packets without requiring segmentation. Ethernet frames of differing sizes may be mixed according to the traffic type carried, so for example voice traffic may be carried within shorter frames to minimise packetisation delay.

In high bit rate communication systems, for example optical networks operating at 1 Gbit/s shared between for example 16 outstations, upstream time slots allocated to each outstation will have high data carrying capacity, even where the time duration of the time slot is relatively small.

Because packet sizes are larger (at least on average), ranging is no longer needed to achieve upstream transmission efficiency as was the case in known lower bit-rate systems. Because guard period between frames represent only a small proportion of the bandwidth available in the high bit-rate system, then unlike existing systems, the relatively long guards required for systems without ranging still represent only a small fraction of the available traffic capacity of the link and so can be tolerated. Furthermore, by reducing the requirement for complex head-end and outstation control systems associated with systems requiring complete ranging schemes, the resulting protocols and equipment are therefore much simpler to implement. Basic synchronisation of the outstations can be achieved using downstream control 102, 112 frames or other known equivalent mechanisms.

By way of example, suppose a PON constructed according to this invention has 16 outstations, situated at varying distances from the head end amounting to 5 km. The round trip propagation delay for a signal travelling on optical fibre is of the order of 10 microseconds per km. To avoid collisions, the guard band between transmissions from different outstations must therefore be at least 50 microseconds in duration. Suppose further that the active time slot (TDMA frame) during which data packets can be transmitted is 200 microseconds. Then the total time taken to interrogate all outstations on the PON is 4 milliseconds and the loss in upstream transmission efficiency is 20% compared to an ideal lossless system using ranging. If the nominal transmitted bit rate is 1 GBps, then each outstation node is able to support an average data rate of 50 MBps in this example.

If the traffic types to be carried on the system allow for higher latency than 4 milliseconds, further increase in efficiency is possible. In a practical system, there may be other overheads in the upstream transmission which affect the efficiency, including, for example, any preamble patterns preceding the transmission of data frames and intended to achieve clock synchronisation at the head end.

In addition, by avoiding segmentation of Ethernet frames, the overhead associated with addressing each smaller packet is also reduced, thereby increasing available bandwidth.

Furthermore, existing technology (in the form of integrated circuits), which already exists for use in other transport systems for IP traffic, can be reused.

In particular, transmissions could be based on physical layer and medium access layer protocols designed for Gigabit Ethernet (IEEE standard 802.3z) supporting a traffic rate of 1 Gbit/s; in the case of the example optical access network, this capacity is shared between customers connected to the same optical splitter. This approach translates into lower costs (through riding the technology curve for such components and taking advantage of the higher manufactured volumes) and consequently shorter time to market.

Available bandwidth can be further increased by use of Wavelength Division Multiplexing (WDM) in the system: distinct groups of subscriber stations may be allocated distinct optical frequencies thereby allowing more subscribers to access the same physical network 15. Typically it is to be expected that each such group of outstations employing a shared frequency would be substantially collocated, successive groups lying along the backbone of the network at differing distances from the head end.

Whilst the method is most attractive at high bit rates in the upstream direction (e.g. in optical access networks supporting data rates in the order of 1–10 Gbps) the method may also be used, though with lesser specific advantage in lower speed networks (e.g. high speed copper or wireless access networks).

Any range or device value given herein may be extended or altered without losing the effect sought, as will be apparent to the skilled person for an understanding of the teachings herein.

The invention claimed is:

1. A point-to-multipoint network arrangement comprising:
   a head-end station;
   at least one subscriber station;
   a point-to-multipoint network providing shared medium connectivity between each subscriber station and the head-end station;
wherein each subscriber station is arranged to transmit data that has previously been segmented into packet-switched transport protocol packets, to the head-end station, using a time division multiple access protocol, the head-end station being arranged to allocate a number of consecutive time slots to each subscriber station, each subscriber station having framing apparatus arranged to frame a packet of at least 576 bytes directly without segmentation of the packet, and synchronisation apparatus arranged to send the frame to the head-end station during an allocation of consecutive time slots and with a guard band determined without using ranging.

2. A point-to-multipoint network arrangement according to claim 1 in which the packet-switched transport protocol employs packets formatted according to an Ethernet protocol.

3. A point-to-multipoint network arrangement according to claim 1 in which the packet-switched transport protocol is arranged to carry Internet Protocol data.

4. A point-to-multipoint network arrangement according to claim 1 in which the packet-switched transport protocol is arranged to carry unsegmented Ethernet frames.

5. A point-to-multipoint network arrangement according to claim 1 in which the TDMA protocol employs frames each arranged to carry multiple packet-switched transport protocol packets.

6. A point-to-multipoint network arrangement according to claim 1 in which the at least one subscriber station is arranged to periodically receive synchronisation signals transmitted from the head end-station.

7. A point-to-multipoint network arrangement according to claim 6 in which differential time delays arising from differing path lengths between the head-end station and outstations are absorbed by including guard bands in the TDMA protocol.

8. A point-to-multipoint network arrangement according to claim 1 in which the point-to-multipoint network is an optical network.

9. A point-to-multipoint network according to claim 8 in which the optical network is a passive optical network.

10. A point-to-multipoint network arrangement according to claim 1 in which the point-to-multipoint network is one of a wireless network or a high-speed copper network.

11. A point-to-multipoint network arrangement according to claim 1 in which each subscriber station is allocated to one of a plurality of groups, each group transmitting on a distinct physical channel.

12. A telecommunications access network comprising a point-to-multipoint network arrangement according to claim 1.

13. The telecommunications access network of claim 12, the point-to-multipoint network arrangement comprising a passive optical network arrangement.

14. A head-end station for a point-to-multipoint network comprising at least one subscriber station, and a point-to-multipoint network providing shared medium connectivity between each subscriber station and the head-end station, the head-end station being arranged to allocate a number of consecutive time slots to each subscriber station, sufficient for a frame containing a packet of at least 576 bytes without segmentation of the packet, the head-end station being arranged to receive the frame from the at least one subscriber station, containing a packet-switched transport protocol packet and transmitted using a time division multiple access protocol with a guard band determined without using ranging, the head end station having apparatus arranged to extract the packet from the frame.

15. A telecommunications network comprising a head-end station according to claim 14.

16. A method of operating a point-to-multipoint network arrangement comprising a head-end station, at least one subscriber station, and a point-to-multipoint network providing optical connectivity between each subscriber station and the head-end station, comprising the steps of:

transmitting upstream using a packet-switched transport protocol over a TDMA protocol having a number of consecutive time slots allocated to each subscriber station, and having guard bands determined without using ranging, inserting a packet of at least 576 bytes into a frame directly without segmentation of the packet and sending the frame during an allocation of consecutive time slots.

* * * * *